(12) United States Patent
Alley

(10) Patent No.: US 9,220,278 B2
(45) Date of Patent: Dec. 29, 2015

(54) FLAT BREAD DINNER WARE SERVING APPARATUS FOR SERVING FLATBREADS, INCLUDING FEATURES TO FORM, FILL, FOLD AND WRAP FLATBREADS, TORTILLAS, BURRITOS, WRAPS AND PASTRY SHEETS IN A UNIQUELY NOVEL CONTROLLED FASHION

(71) Applicant: Kenneth Alley, Tampa, FL (US)

(72) Inventor: Kenneth Alley, Tampa, FL (US)

( * ) Notice: Subject to any disclaimer, the term of this patent is extended or adjusted under 35 U.S.C. 154(b) by 168 days.

(21) Appl. No.: 14/032,137

(22) Filed: Sep. 19, 2013

(65) Prior Publication Data

US 2014/0087041 A1    Mar. 27, 2014

Related U.S. Application Data

(60) Provisional application No. 61/744,349, filed on Sep. 25, 2012.

(51) Int. Cl.
*A21C 9/06*   (2006.01)
*A21C 15/00*  (2006.01)

(52) U.S. Cl.
CPC ............... *A21C 9/063* (2013.01); *A21C 15/007* (2013.01)

(58) Field of Classification Search
CPC ............................. A21C 9/063; A21C 15/007

USPC .............. 99/450.1–450.6; 426/291, 138, 496, 426/502, 512, 514
See application file for complete search history.

(56) References Cited

U.S. PATENT DOCUMENTS 5,417,996 A * 5/1995 Brink ............................. 426/502
2007/0144359 A1* 6/2007 Ekberg et al. ................ 99/450.4

FOREIGN PATENT DOCUMENTS

WO    WO 8900008 A1 *  1/1989 ............. A21C 11/00

* cited by examiner

*Primary Examiner* — Jianying Atkisson
(74) *Attorney, Agent, or Firm* — Shumaker, Loop & Kendrick, LLP

(57) ABSTRACT

A Flatbread Dinner Ware apparatus to serve flatbreads tortillas including features to assists the consumer in properly filling folding and wrapping flatbreads by forming a recessed center cavity, creating and controlling fold lines and fold line creases that forms maintains and controls the shape of a flatbread tortilla as it is being assembled. The folding apparatus converts the shape of a flatbread tortilla by providing a plate like tool-template that controls each end section, and the top and bottom sections (folds) of a flatbread tortilla as it is being assembled (wrapped). The tortilla wrapper apparatus also provides a pocket to determine the proper amount of foodstuff to be placed into the apparatus.

15 Claims, 4 Drawing Sheets

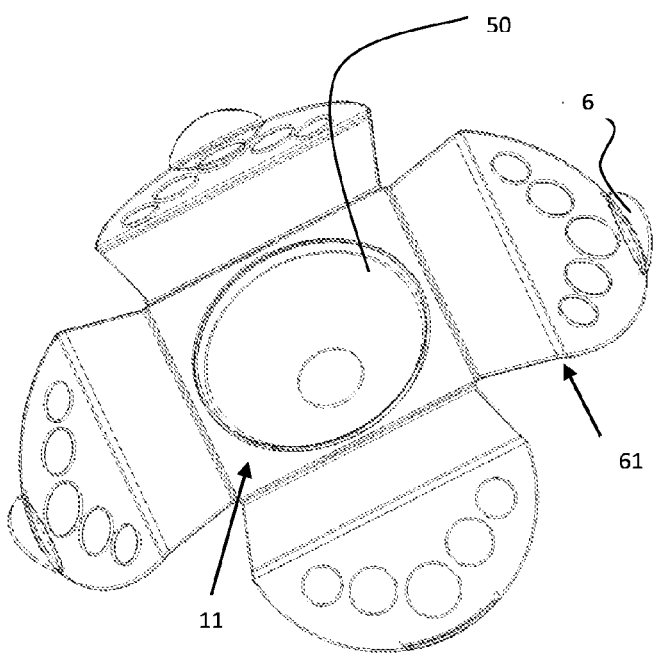
Figure 6
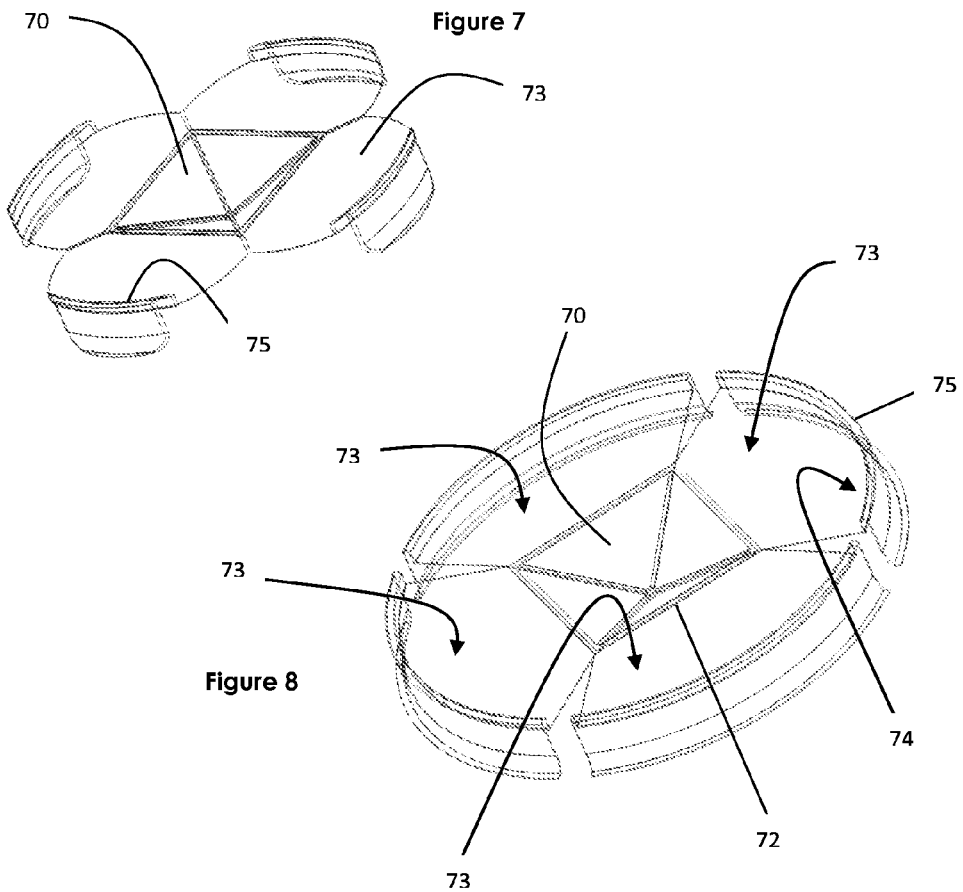
Figure 7
Figure 8

FLAT BREAD DINNER WARE SERVING APPARATUS FOR SERVING FLATBREADS, INCLUDING FEATURES TO FORM, FILL, FOLD AND WRAP FLATBREADS, TORTILLAS, BURRITOS, WRAPS AND PASTRY SHEETS IN A UNIQUELY NOVEL CONTROLLED FASHION

CROSS REFERENCE TO PRIORITY APPLICATION

This application claims priority under all applicable statutes to U.S. Provisional Patent Application No. 61/744,349 filed Sep. 25, 2012.

FIELD OF THE INVENTION

This invention relates generally to a solution to serve flatbreads, including features to fill, fold and wrap Flatbreads and Tortillas that are difficult to fold and wrap properly. More particularly, the present invention is directed to an apparatus and method of filling and wrapping/folding flatbreads, tortillas, burritos, wraps and pastry sheets in a neatly controlled fashion. The invention also serves as a Flatbread dinnerware (plate) for serving flatbreads, tortillas burritos and wraps.

BRIEF DESCRIPTION OF THE PRIOR ART

There are several types of flatbread tortillas: As per Wikipedia, Flatbread tortillas have been eaten for thousands of years in Mexico, where they are a staple. More recently, other countries have begun producing them to serve the expatriate Mexican market and the growing demand for Mexican food, particularly in North America, Europe and Eastern Asia. Mexican tortillas are commonly prepared with meat to make dishes such as tacos, burritos, and enchiladas. In appearance and use these tortillas are rather similar to Indian chapatti. Folding of the tortilla often requires a skill to prevent the tortilla from losing it contents when one picks it up as it is being consumed. For example a burrito has the ends folded up creating a pocket, unlike the wrap which has open ends like a taco. A burrito holds your food within (by means of the end folds) on the flatbread, unlike a wrap which commonly have the contents falling out the open ends.

Alternative solutions have been developed to fold a tortilla such as Woodworth et al, U.S. Pat. No. 4,638,729 apparatus for folding a dough sheet and foodstuffs. This particular apparatus patented in 1987 consist of a large machine that created flat dough and had die cutting means and mechanically folded the flexible dough to create commercially processed foodstuff for the consumer food chain. This particular manufacturing equipment was a large scale machine that could not be used by a consumer at home or could it be adapted to the original packaging of a consumer product.

U.S. Pat. No. 5,263,407 teaches a novel apparatus for high volume, fully automatic preparation of a folded food product having an exterior food wrap folded about an inner filling. Further, the apparatus comprises a continuous conveyor means for transporting said food product through a plurality of folding stations. U.S. Pat. No. 5,263,407 apparatus was designed to solve the tedious manual method of hand wrapping folded food products using electromechanical machinery thus, Pamora teaches means to automatically prepare at high speeds a variety of Mexican food products such as burritos and enchiladas, as well as other folded food products such as egg rolls.

US Patent 20070228035 A1 describes a Warmer for tortillas and the like. A microwavable container for transporting heated materials such as tortillas from a heating apparatus to a location for consumption. They describe plurality of trays in generally stacked array to receive tortillas preventing them from sticking together and keeping them warm. It does not describe a serving plate dinnerware nor does their apparatus include moving parts.

U.S. Pat. No. 4,491,601A teaches a Method of making a readily portable burrito on a stick. Instead of folding a flatbread the ends are wrapped on a stick making it portable and easier to consume.

Additionally, there has been tortilla bowls sold that when a tortilla is baked into a particular shaped mold, the baked tortilla retains the shape of the mold. These are commonly used at chain restaurants like Chilies to serve taco salads, etc. Consumer versions of it exist and are sold on TV. The mold is shaped to form a bowl and has no moving parts and does not fold the tortilla in order to create a wrap or burrito.

Several companies use clamshell vacuumed packaging including, popular food chains like McDonalds. Clamshell packaging helps to assemble the food product within the original packaging and by snapping the container shut the product can be sold. Clamshell packaging does provide means to control the filling wrapping and folding of flatbreads tortillas in a controlled fashion.

There have been numerous automated mechanisms that have been developed and used by industry for decades to fold food products that includes; series of flippers to fold food products, flaps to move and orient foodstuff and presses to create forms. There have also been manual devices including flat templates to fold clothing that utilize a series of hinged flippers, thus making it obvious that such a mechanism could be adapted to folding a Flatbread burrito or tortilla.

In this application Alley teaches a novel dinnerware that incorporates unique features to serve fill and fold flatbreads. The "Flatbread Wrapping Apparatus" that is the subject invention is a novel approach to solving a very common and recognized problem of properly filling and folding flatbread tortillas in such a fashion, so that after they are filled the food contents do not fall out when the tortilla is being consumed.

SUMMARY OF THE INVENTION

The present invention here on referred to as the Flatbread Dinnerware Tortilla Wrapper which is designed to serve flatbreads tortillas, fill and fold flatbreads, tortillas, burritos, enchiladas, tostadas, flatas and or pastry sheets. U.S. Provisional Application No. 61/744,349 filed Sep. 25, 2012 to Kenneth Alley discloses a plate like template tool dinnerware to assist in filling and wrapping/folding flatbreads, tortillas, burritos, wraps and pastry sheets in a neatly controlled fashion. U.S. Provisional Application No. 61/744,349 filed Sep. 25, 2012 to Kenneth Alley is incorporated by reference as if fully set forth herein.

The present invention consists of a plate like template tool that is used to serve flatbreads. The dinnerware includes moving flaps that are positioned around the center section to assist the consumer in filling and wrapping/folding flatbreads, tortillas, burritos, wraps and pastry sheets in a neat controlled fashion. The "Flatbread Dinnerware Tortilla Wrapper" helps the consumer to control the filling and folding/wrapping aspects of the flatbread, so that when the tortilla is being consumed the foodstuff will not fall out of the tortilla ends, which is a common experience among users of flatbreads.

The "Flatbread Dinnerware Tortilla Wrapper" provides means to manually create, properly position and control fold lines (creases) of both ends and both sides of a typical tortilla, flatbread and or wrap. The "Flatbread Tortilla Wrapper Dinnerware" also provides a pocket to position and quantify the food filling within the center section of the apparatus and provides 4 folding flaps in a partially square or rectangular shape that control the fold lines thus, wrapping the tortilla at the right locations relative to the food filling. The "Alley Tortilla Wrapper" apparatus also creates a partially pinched fold line thus, forming a flatted section along the fold line/surface to create a condition so that the wrap or tortilla remains closed during the folding procedure.

The "Alley Flatbread Dinnerware Tortilla Wrapper" apparatus is currently brand named by Kenneth Alley, as the (Flip Wrap™). Other brand names could include the Burrito Wrapper™, Tortilla Wrapper™ Burger Wrapper™ and or the Flip n Wrap™. Kenneth Alley has each of the associated.com names for the above brands. The "Alley Flatbread Dinnerware Tortilla Wrapper" provides and inexpensive novel solution that helps the consumer properly fill fold and or wrap a flatbread at home, just as well as the expensive automated factory machinery.

The typical way to wrap a tortilla is to lay the flatbread onto a flat surface. The food stuffing is then placed into the center section of the tortilla. The amount of foodstuff to place into the center section is purely a guess. (If too much foodstuff is placed onto the tortilla, when folded and wrapped the tortilla will typically fall apart and or the ends will open and foodstuff will spill out of the tortilla as it is consumed.) The ends (left and right) of the tortilla are then folded inward and must be held temporarily is that position until the top and bottom portion of the tortilla are folded over top of the end pieces. The flatbread is flexible and therefore, it will reopen if not continually held closed either by the consumer or a paper wrapper.

The present invention consists of a dinnerware, a food serving plate, a plate like template/tool that is placed onto of a flat surface such as a table. A flexible tortilla or wrap is placed over top and onto the Alley tortilla wrapper apparatus. The tortilla can easily be positioned so that, it is centered onto the template wrapping tool. The apparatus has a tapered center section pocket. The tortilla will conform onto the template and will dip into the center pocket thus creation a defined pocket to place foodstuff. Depending on the softness of the particular flatbread tortilla wrap, the entire device with the tortilla can be placed into the microwave to help soften the tortilla if necessary. By placing a tortilla onto the apparatus and stacking a $2^{nd}$ apparatus onto the first apparatus the bottom center section will help define and form by compression molding a pocket into the flatbread tortilla thus providing means to define the exact place to place food filling and to define the precise quantity of food filling to be placed onto the tortilla. This pocket provides means to control the quantity and position of the foodstuff during assembly of the tortilla (preventing over-fill etc. . . . ). Adjacent to the center pocket there are left and right end folding flaps and top and bottom folding flaps that are attached to the outer perimeter of the center sections pocket.

After filling the tortilla with foodstuff, left and right end folding flaps can be rotated inward and up to 180 degrees creating a partially pinched folded crease into the flexible tortilla. The pinched crease is controlled by a partially flatted landing surface located around the perimeter of the center pocket. Additionally, left and right end folding flaps may include geometry thus, creating pressure points precisely along the hinged section of the apparatus. Left and right end folding flaps may include geometry to create a crease line perpendicular to the end fold crease lines thus, creating a grove so that when folding the top and bottom flaps over the ends of the tortilla, a neat corner section will be formed to help tightly lock the tortilla ends from reopening as the tortilla is consumed.

After left and right folding flaps are pressed inward they can now be opened. The geometry of the apparatus specifically, the folding flap geometry that communicates with the outer edge landing surface area geometry, will cause the tortilla ends to stay closed. At this point, the top folding flap can be rotated inward up to 180 degrees also creating a neatly controlled crease and locking down ends of the tortilla. The top flap can then be opened and the same step can be repeated for the bottom folding flap.

The tortilla, at this point will be folded along hinges (living or snapped) and pressed onto landing surface and center pocket. At this point all four sides of the tortilla have been neatly folded in a controlled fashion forming a neat shape determined by the Alley Tortilla Wrapper design, i.e., square, round or rectangular etc. The tortilla can then be consumed in the said dinnerware.

If desired a standard plate can be placed over top of the tortilla and by flipping the Alley Tortilla Wrapper over onto a plate the tortilla can be removed and reused to make another tortilla. The wrapper may include a knife slot to evenly cut the tortilla into two neat sections.

The present invention provides a novel dinnerware solution that assists the consumer to easily fill and wrap/fold flatbread tortillas, flatbreads, burritos, wraps and other pastry sheets. In order to be useful as a consumer product the apparatus that is the subject of this invention has to be easy to use, easy to understand, physically small enough to be practical and most importantly inexpensive. The ideal solution would be an invention that could be sold separately as an aftermarket consumer product including a dinnerware designed for serving flatbreads such as tortilla and or wraps that are commonly used for making burritos or flatbread sandwiches. Another version could easily be adapted to packaging of the tortillas, flatbreads, wraps etc. . . . so that when purchasing a pack of flatbread tortillas a "Flatbread Wrapping Apparatus (this Invention)" becomes part of the actual package or comes with the purchase of a package of Flatbreads and or tortillas. For example; by vacuum forming or thermal forming a thin walled sheet it would be possible to provide a "Flatbread Wrapping Apparatus" as part of or within the original packaging of tortillas. The "Flatbread Wrapping Apparatus" must be simple to use, to integrate and instructionally educate the consumer. The subject invention consists of an aftermarket solution consumer product that provides means to fill wrap and fold the typical tortillas, flatbreads, burritos, wraps and or pastry sheets that are difficult to properly fold so that the contents do not fall out of the ends during consumption. The "Flatbread dinnerware Wrapping Apparatus" could be marketed by means of direct television, infomercials, and typical retail. The invention can also be adapted into the original manufacturer's packaging.

BRIEF DESCRIPTION OF THE DRAWINGS

The foregoing summary, as well as the following detailed description may be better understood when read in conjunction with the accompanying drawings, which are incorporated in and form a part of the specification. The drawings serve to explain the principles of the invention and illustrate embodiments of the present invention that are preferred at the time the application was filed. It should be understood, however, that the invention is not limited to the precise arrangements and instrumentalities shown. There are numerous types of template apparatus designs that could be adapted to provide the utility of a tool plate like template to fill fold and wrap flatbreads, tortillas, burritos, enchiladas, tostadas, flatas and or pastry sheets controlled fashion.

In the drawings:

FIG. 6 is an isometric view of an alternative design to include a rounded center section versus a rectangular center section. The uniquely shaped folding flaps are angled downward. This particular design would not require stabilizing legs and would provide more clearance for larger wraps for burgers and sandwiches.

FIG. 7 is an alternative perspective view example of a Flatbread Dinnerware Tortilla Wrapper that could be thermal formed and used as part of the original packaging for flatbreads and tortilla's. This particular design does not require a landing surface area to create a crease; instead it forces the tortilla into a pocket so that the pocket holds the entire tortilla after all 4 flaps have been folded inward.

FIG. 8 is another alternative perspective view example of the Flatbread Dinnerware Tortilla Wrapper that could be thermal formed and used as part of the original packaging for flatbreads and tortilla's. This particular design does not require a landing surface area to create a folding crease; instead it forces the tortilla into a pocket so that the pocket holds the entire tortilla after all 4 flaps have been folded inward.

DETAILED DESCRIPTION OF THE PREFERRED EMBODIMENT

Figure 1:
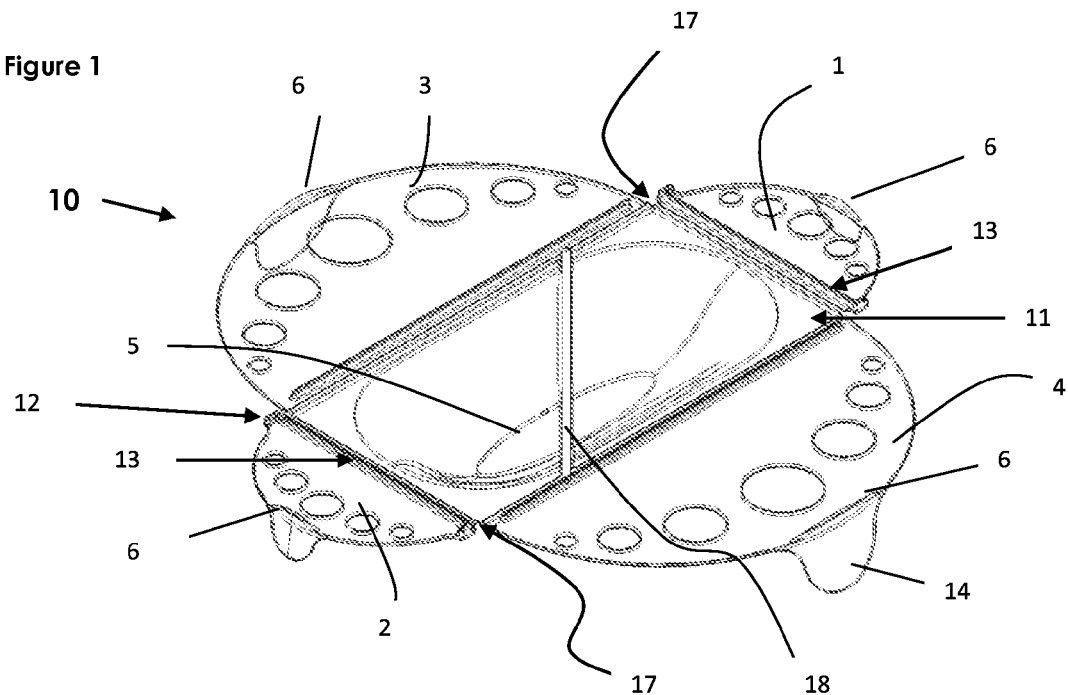
FIG. 1 is a front perspective isometric top view of the Flatbread Dinnerware Tortilla Wrapper. (This particular design is ideal for injection molding. A thermal formed part will appear somewhat different although will provide the same utility)

In describing a preferred embodiment of the invention, specific terminology will be selected for the sake of clarity. However, the invention is not intended to be limited to the specific terms so selected, and it is to be understood that each specific term includes all technical equivalents that operate in a similar manner to accomplish a similar purpose.

The terms "right", "left", "top", "bottom", "lower" and "upper" designate relative directions in the drawings to which reference is made.

The preferred embodiments of the present invention will now be described in detail with reference to the accompanying drawings in which a novel apparatus 10 is described;

Now referring to FIG. 1, a front perspective isometric top view of the Alley Tortilla Wrapper, a flexible flatbread tortilla is placed over top and onto the apparatus 10. Guides 6 which are positioned, on the outer edges of the folding flaps 1, 2, 3, and 4 of apparatus 10, help to properly center the wrap over top of the Alley Tortilla Wrapper. The apparatus 10 has a tapered center section pocket 5. The tortilla will conform onto the template and will dip into the center pocket 5 thus creating a defined pocket to place foodstuff. Depending on the softness of the particular flatbread tortilla wrap, the entire device with the tortilla can be placed into the microwave to help soften the tortilla if necessary.

Additionally, if necessary, by placing a tortilla onto the apparatus 10 and stacking a $2^{nd}$ apparatus 10 onto the first apparatus, the tapered center sections pocket 5 of both apparatus will help define and form a recessed center pocket into the flatbread thus, compression molding a pocket into the flatbread tortilla will provide means to define the exact place to place food filling and will define the precise quantity/volume of food filling to be placed onto the tortilla. Stacking multiple or several apparatus's together with flatbreads and placing them into a microwave will assist in forming the flexible flatbreads during assembly.

Once the tortilla is positioned properly the user can place the food filling onto the center section of the tortilla that has been formed by pocket 5. As the food is placed into the center pocket of the tortilla, there will be a visual and quantifiable defined space that will determine how much filling should placed onto the tortilla. Using finger grips 14, End folding flaps 1 and 2 are then flipped inward along the living hinges 17. Flaps 1 and 2 can rotate up to 180 degrees at which point, they will compress the flatbread tortilla between Flaps 1 and 2 and landing area 11. Flaps 1, 2 and landing area 11 may contain special raised features 13 to help create a pinch and or fold line to ensure that the tortilla will stay closed after folding flaps 1 and 2 of apparatus 10 are re-opened. Left and right end folding flaps 1 and 2 may include geometry 12 thus, creating pressure points and crease lines precisely along the hinged (corner) section 17 of the apparatus 10. Additionally, Left and right end folding flaps 1 and 2 may include geometry 12 to create a crease line 90 degrees perpendicular to the end fold crease lines thus, creating a grove and corner into the tortilla so that when folding the top and bottom flaps 3 and 4 over the ends of the tortilla, a neat corner section will be formed to help tightly lock the tortilla ends from reopening as the tortilla is consumed. After folding Ends Flaps 1 and 2, the end flaps will pop back to their normal opened position or they can manually be re-opened.

Folding Flap 3 can then be rotated inward along living hinges 17 which extend around the perimeter of landing area 11 of apparatus 10. Repeating the steps, Folding Flap 4 can then rotated inward and re-opened. The tortilla, at this point will be folded along hinges (living or snapped) and pressed onto landing surface and into center pocket.

At this point, all four sides of the tortilla have been neatly folded in a controlled fashion forming a neat shape determined by the Alley Tortilla Wrapper design of apparatus 10, (i.e., square, round or rectangular etc). The tortilla can then be consumed in the dinnerware or can be removed. If desired a plate can be placed over top of the tortilla and by flipping apparatus 10 over onto a plate the tortilla can be evenly cut into 2 sections by using knife slot 18.

Figure 2:
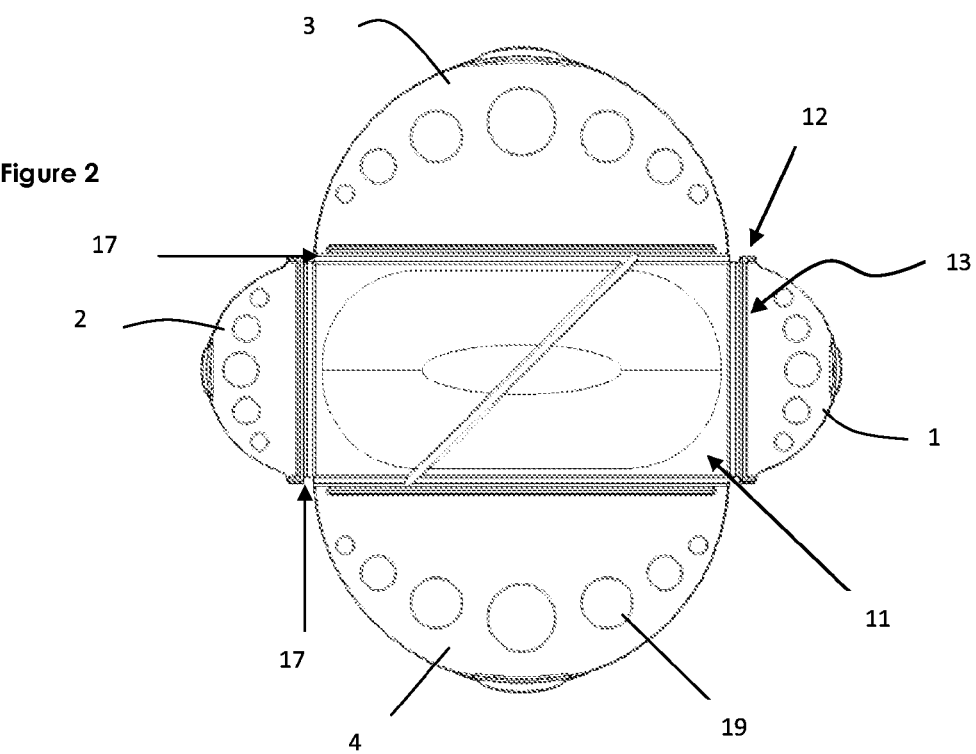
FIG. 2 is a top front perspective view of the Flatbread Dinnerware Tortilla Wrapper.
Figure 3:
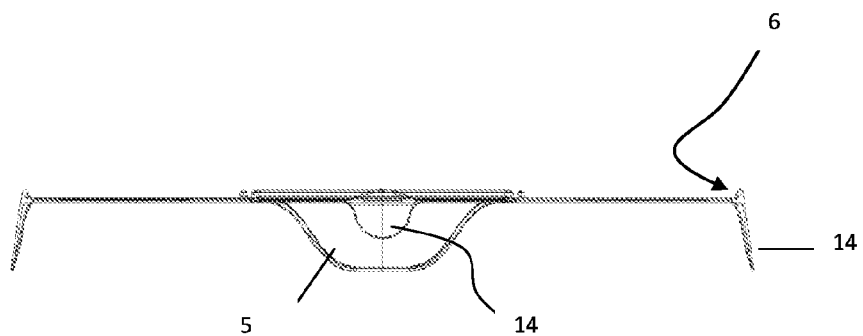
FIG. 3 is a side profile perspective view of the Flatbread Dinnerware Tortilla Wrapper.
Figure 4:
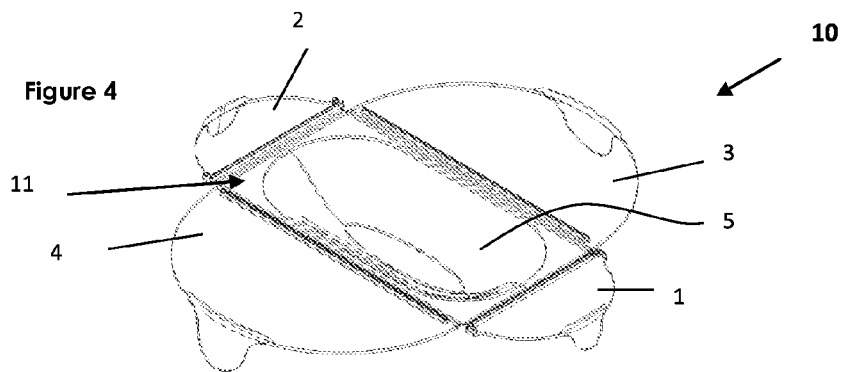
FIG. 4 is an alternative configuration isometric top view of the Flatbread Dinnerware Tortilla Wrapper. (This particular design is could be vacuumed formed or injection molded).

Referring to FIGS. 2 and 3, show a top front perspective view and a side profile view of the apparatus 10. Recessed or raised dimples or holes 19 would help prevent the flatbreads or pastries from sticking to folding flaps 1, 2, 3 and 4. I FIG. 3 the finger grips 14 also stabilize the dinnerware on a dining table as the food is being consumed. FIGS. 2, 3 and 4 include a solid base that makes this configuration idea for a Flatbread dinnerware serving plate. The tapered design of the dinnerware provides means for easy stacking.

FIG. 4 is an alternative configuration isometric top view of the Alley Tortilla Wrapper apparatus 10. (This particular design is could be vacuumed formed or injection molded). Similar to FIG. 1, in this configuration folding flaps 1, 2, 3, and 4 do not include holes 19 shown in FIGS. 1 and 2. Also knife slot 18 is not present. In this particular design pocket 5 has a solid base and could be used as a baking apparatus. After the flatbread tortilla or pastry sheet has been folded apparatus 10 could be placed into an oven or microwave to cook. Apparatus 10 could be made out of metals, ceramics or other heat resistant materials. Folding flaps 1-4 could be attached to the landing area 11 by mechanical hinges or if molded in plastics folding flaps could consist of a living hinge.

Figure 5:
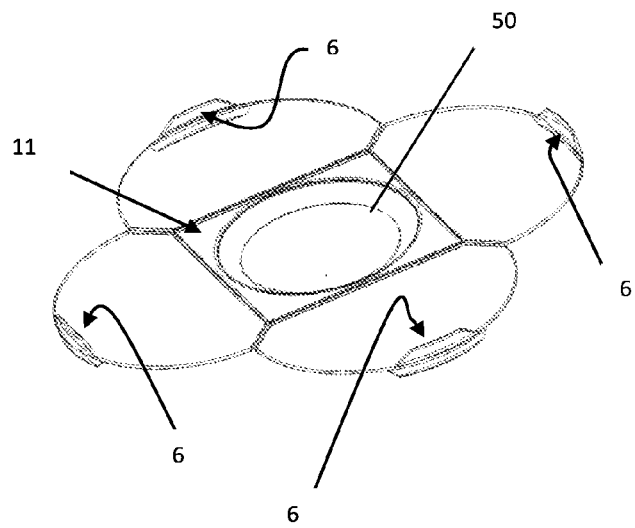
FIG. 5 is an isometric view of an alternative design to include a rounded center section versus a rectangular center section. Both designs include a sealing surface on their outer edge which helps to crimp the wrap or flatbread during the folding process.

FIGS. 5 and 6 are isometric views of alternative designs that include rounded center section 50 versus a rectangular center section. Both designs include sealing surface 11 on their outer edge which helps to crimp the tortilla, wrap, pastry or flatbread during the folding process. In FIG. 6, uniquely shaped folding flaps 61 are angled downward. This particular design would not require figure grips 14 of apparatus 10 and would provide more clearance and stability for larger round wraps for burgers and sandwiches. Guides 6 will help to center the flatbreads or pastry onto the apparatus center section 50. The slightly tapered recessed pocket will form the flatbread as it is being assembled. As in the other configurations apparatus 10 is designed to allow stacking with or with flatbreads. It may be desired to have several tortilla wrappers stacked onto each other and micro waved in order to soften rigid flatbreads. The interior and exterior bottom of the center sections of the apparatus will help form the flatbreads center pocket outlining the foodstuff filling section.

Now Referring to FIGS. 7 and 8 are alternative perspective views of an Alley Tortilla Wrapper that could be thermal formed (vacuumed formed) and used as part of the original packaging for flatbreads and tortilla's. This particular design does not require a landing surface area to create a crease; instead it forces the tortilla into center pocket 70 so that pocket 70 holds the entire tortilla after all flaps 73 have been folded inward along living hinge 72 which extends around the perimeter of pocket 70. On the outer most edge raised lip feature 75 encases flatbreads tortillas as the original packaging. A consumer would receive an Alley Tortilla Wrapper Apparatus with each purchase of flatbreads tortilla wraps etc.

Figure 9:
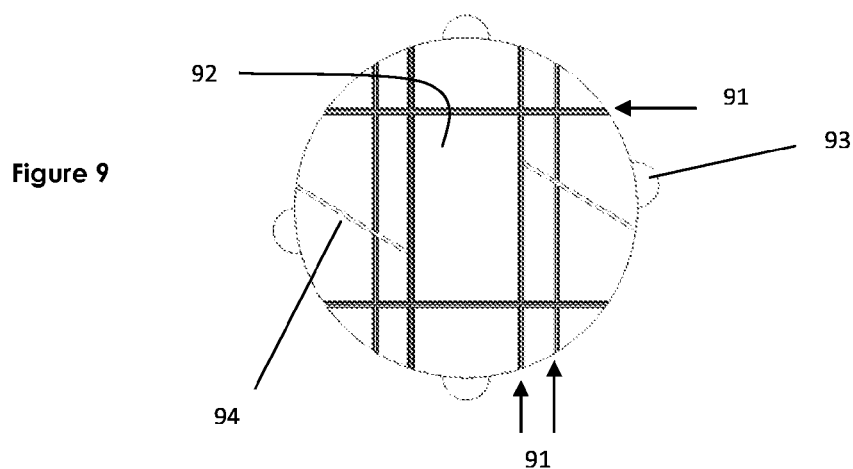
FIG. 9 is an alternative design of the Flatbread Dinnerware Tortilla Wrapper that consists of a flatted center. In this particular design there are living control hinges built into the wrapper to control the folding areas. This particular design could be used for sushi roll, wraps that are rolled or for flatbreads.

FIG. 9 is an alternative design of the Alley Tortilla Wrapper that consists of flatted center 92. In this particular design there are living control hinges 91 in both the horizontal and vertical directions which are built into a flexible wrapper apparatus of FIG. 9 that controls the folding locations of a flatbread. This particular design could be used for sushi roll, wraps that are rolled or for flatbreads. A silicone type material would allow the tortilla wrapper to be rolled to create open ended wraps or folded similar to apparatus 10. Finger grips 93 extend on the outer edges of the wrapper to provide information where the fold lines hinges 91 are after a tortilla is places onto the wrapper. Addition knife slots 94 will align together when a flatbread or wrap is rolled.

Figure 10:
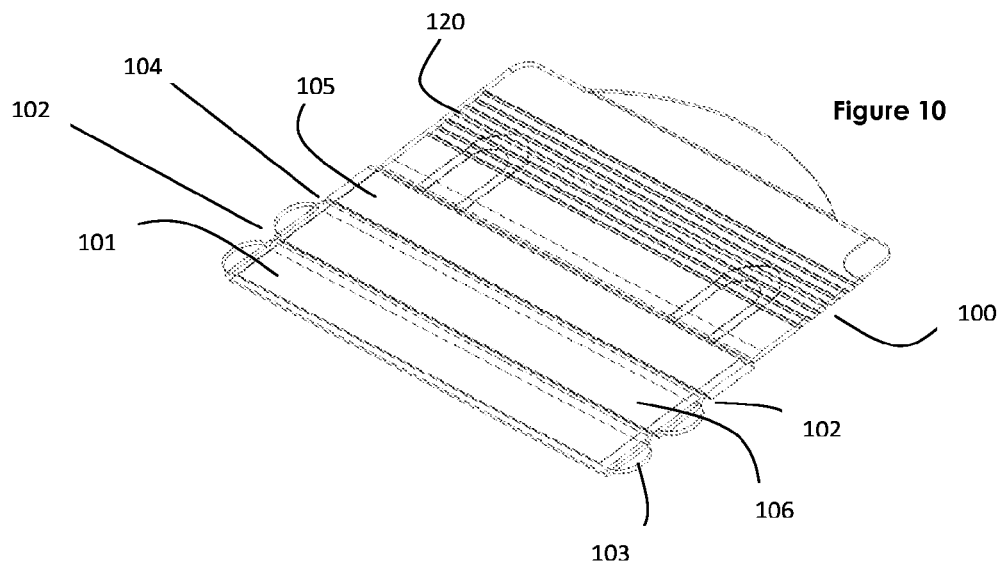
FIG. 10 is an alternative design of the Alley Tortilla Wrapper that consists of horizontal folding flaps. In this particular design there are no end fold flaps. This particular design could be used for sushi roll, wraps that are rolled or for flatbreads with open ends.

FIG. 10 is an alternative design of the Alley Tortilla Wrapper that consists of horizontal folding flaps 101,106 and hinges (living) 102 which are located between folding flaps 101 and 106. In this particular design there are no end fold flaps. This particular design could be used for sushi rolls, wraps that are rolled or for flatbreads with open ends. A sushi seaweed or flatbread wrap would be placed onto the apparatus shown in FIG. 10. Foodstuff would be placed onto the sushi seaweed or wrap along flat platform 105. Folding flap 101 can be rotated inward along hinge 102 using finger grip 103. The process is repeated thus, folding flap 106 is rotated inward along hinge 104. The wrap or roll will now be positioned onto of ridged platform 105. The folding flaps are re-opened after each fold. A flexible silicone or rubber like mat 100 can then be pulled over top of the roll and compressed to form a tight desired shape of the roll. Rib like features 120 in mat 100 provides means to shape the roll into various shapes (triangular, square or rounded etc. . . . ).

Figure 11:
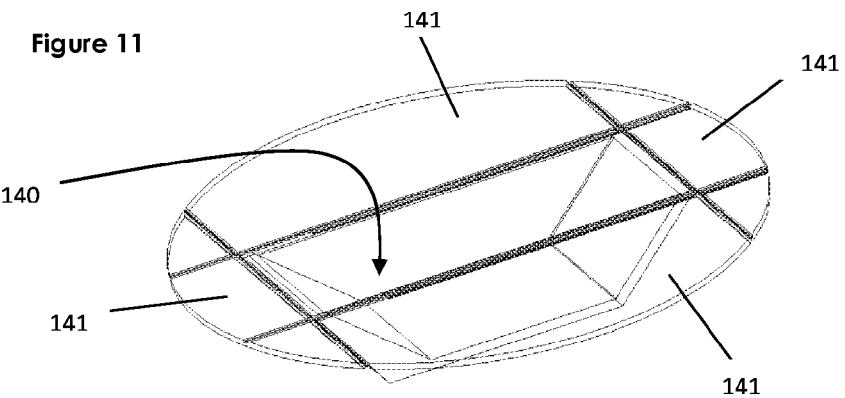
FIG. 11 is another alternative design example of a Flatbread Dinnerware Tortilla Wrapper that could be thermal formed or injection molded and/or also used as part of the original packaging for flatbreads and tortilla's. This particular design does not require a landing surface area to create a folding crease; instead it forces the tortilla into a pocket so that the pocket holds the entire tortilla after all 4 flaps have been folded inward. A similar design could include an indentation to add a round and rectangular pocket into the same apparatus.

FIG. 11 is another alternative design example of an Alley Tortilla Wrapper that could be thermal/vacuumed formed or injection molded and/or also used as part of the original packaging for flatbreads and tortilla's. This particular design does not require a landing surface area to create a folding crease instead, folding flaps 141 force the tortilla into a center pocket 140 so that the pocket holds the entire tortilla after all 4 flaps have been folded inward. A similar design could include an indentation to add a round and rectangular pocket into the same center pocket 140 of the apparatus. The apparatus in FIG. 11 could include smaller flaps that could remain closed and a false bottom. Each flap could be closed and stay closed thus allowing the apparatus to be lifted off the wrap after it's folded. There are many configurations that could be adapted to the described invention.

What is claimed is:

1. A flatbread dinnerware apparatus for forming folded food product by making multiple folds of a flexible flatbread around a recessed cavity containing filler comprising:
    a center portion having four sides and a substantially flattened surface around the perimeter thereof;
    a recessed cavity having a predetermined volume formed in the center portion with downward sloping side walls connecting downward to a bottom surface and upward to the substantially flattened surface around the perimeter;
    a plurality of folding surfaces hingedly connected to at least two of the sides of the center portion and adjacent the flattened surface thereof and moveable between an open and a closed position;
    wherein at least a portion of the flatbread is compressed between the at least one folding member and the substantially flattened surface of the central portion when the at least one folding member is in the closed position.

2. The apparatus of claim 1 wherein the center portion is a rectangle.

3. The apparatus of claim 1 wherein the center portion is a square.

4. The apparatus of claim 1 wherein the recessed cavity is in the shape selected from circular, semi-circular, ovoid, pyramidal, cubic and rectangular.

5. The apparatus of claim 1 further comprising:
    at least one raised protrusion on a first folding surface adjacent a first side of the substantially flattened surface of the center portion;

at least one raised protrusion on a second folding surface adjacent a second side of the substantially flattened surface of the center portion;
wherein the second side of the substantially flattened surface is substantially perpendicular to the first side of the substantially flattened surface.

6. The apparatus of claim 1 wherein the recessed cavity includes a slot extending through at least two side walls and bottom surface thereof.

7. A flatbread forming platform for folding folded food product by compression forming a flexible flatbread between multiple forming platforms comprising:
   a first platform comprising:
      a center portion with four sides and a substantially flattened surface around the perimeter thereof;
      a recessed cavity having a predetermined volume formed in the center portion with downward sloping side walls connecting downward to a bottom surface and upward to the substantially flattened surface around the perimeter;
      a plurality of folding surfaces hingedly connected to at least two of the sides of the center portion and adjacent the flattened surface thereof; and
   a second platform comprising:
      a center portion with four sides and a substantially flattened surface around the perimeter thereof;
      a recessed cavity having a predetermined volume formed in the center portion with downward sloping side walls connecting downward to a bottom surface and upward to the substantially flattened surface around the perimeter;
      a plurality of folding surfaces hingedly connected to at least two of the sides of the center portion and adjacent the flattened surface thereof
   wherein the recessed cavities of the first and second platforms are of substantially equal shape and size such that the recessed cavity of the first platform can receive the recessed cavity of the second platform when the devices are stacked.

8. The apparatus of claim 1, wherein at least one said folding surfaces include at least one aperture extending there through.

9. The apparatus of claim 8 wherein the at least one folding surface has a plurality of apertures arrange along the perimeter thereof.

10. The apparatus of claim 1 wherein at least one of the folding surface further comprises a plurality of raised protrusions on the surface thereof adjacent the perimeter of the folding surface.

11. The apparatus of claim 1 further comprising:
   at least one raised protrusion on a first side of the substantially flattened surface of the center portion adjacent a first folding surface;
   at least one raised protrusion on a second side of the substantially flattened surface of the center portion adjacent a second folding surface;
   wherein the second side of the substantially flattened surface is substantially perpendicular to the first side of the substantially flattened surface.

12. The apparatus of claim 1 wherein the folding surfaces are substantially semi-circular.

13. The apparatus of claim 1 further comprising a single folding surface hingedly connected to each of the four sides the sides of the center portion and adjacent the flattened surface thereof.

14. The apparatus of claim 13 wherein opposing folding surfaces are of substantially equally size.

15. The apparatus of claim 13 wherein opposing folding surfaces are of substantially equally size and adjacent folding surfaces are of a different size.

\* \* \* \* \*